No. 826,617. PATENTED JULY 24, 1906.
G. SHUGERS.
WHEEL.
APPLICATION FILED DEC. 6, 1905.
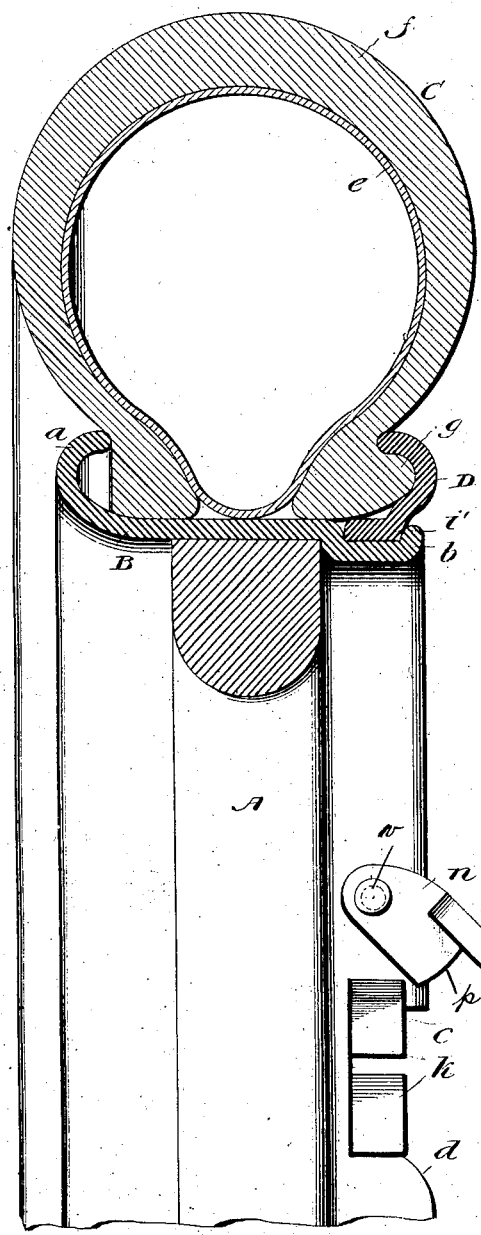
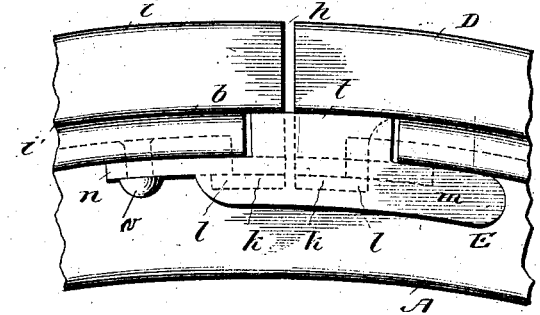
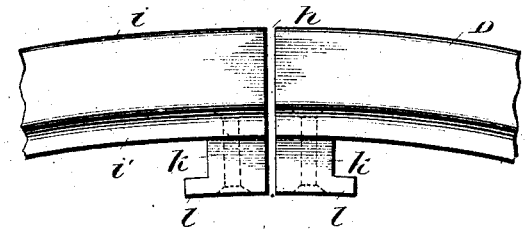
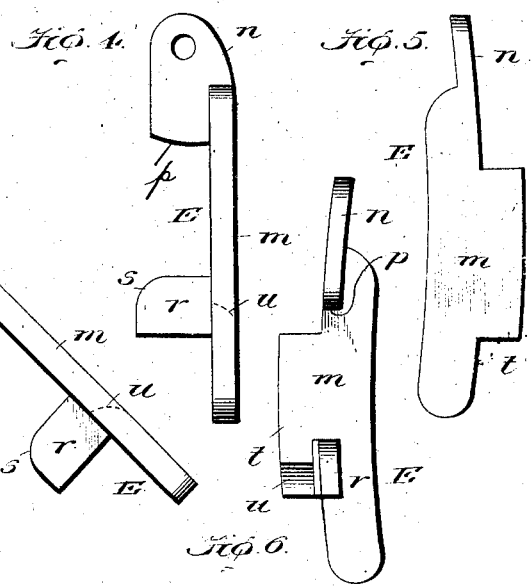
Witnesses:
Wm. C. Dashiell
N. C. Healy
Inventor:
George Shugers,
by James J. Shuhy
Atty.

UNITED STATES PATENT OFFICE.

GEORGE SHUGERS, OF AUBURN, INDIANA.

WHEEL.

No. 826,617.　　　　Specification of Letters Patent.　　　　Patented July 24, 1906.

Application filed December 6, 1905. Serial No. 290,613.

*To all whom it may concern:*

Be it known that I, GEORGE SHUGERS, a citizen of the United States, residing at Auburn, in the county of Dekalb and State of Indiana, have invented new and useful Improvements in Wheels, of which the following is a specification.

My invention pertains to wheels provided with pneumatic and analogous tires, and more particularly to the rims of such wheels, and it contemplates the provision of a wheel-rim constructed with a view of precluding casual displacement or disconnection of a tire, while permitting of the tire being readily placed and secured in position and as readily removed when desired, and this without entailing cutting or other impairment of the tire.

With the foregoing in mind the invention will be fully understood from the following description and claims when the same are considered in connection with the accompanying drawings, forming part of this specification, in which—

Figure 1 is a sectional view of so much of a wheel as is necessary to illustrate the present and preferred embodiment of my invention, the same being shown with the tire in proper position relative to the rim and the fastener of the tire-clenching band in its open position. Fig. 2 is a side elevation illustrating the construction shown in Fig. 1 with the tire removed and the fastener of the tire-clenching band in its closed position. Fig. 3 is a detail side elevation illustrative of the end portions of the clenching-band and the appurtenances thereof. Fig. 4 is a plan view of the before-mentioned fastener. Fig. 5 is a side elevation of the fastener, and Fig. 6 is an elevation illustrating the side of the fastener opposite to that shown in Fig. 5.

Similar letters designate corresponding parts in all of the views of the drawings, referring to which—

A is a wheel-felly, which may be of wood or other suitable material and of the construction shown or of any other construction compatible with the purpose of my invention, and B is a rim-body which entirely surrounds and is preferably fixed with respect to the felly. In the preferred embodiment of my invention the said rim-body is made of rolled steel, is shaped to describe a complete circle, and is provided at one side with an inturned retaining-flange $a$ and at its opposite side with a portion $b$ of channel form in cross-section, as best shown in Fig. 1, in which is an opening $c$ for a purpose presently set forth. One wall $d$ of the said opening $c$ has its corner rounded, as clearly illustrated in Fig. 1, with a view of enabling the closure portion of the fastener to snugly fit the said wall when the fastener is swung to its closed position.

C is a tire which may be of any suitable type and construction without involving a departure from the scope of my invention. I prefer, however, to employ an ordinary pneumatic tire—that is to say, a tire comprising an inflatable tube $e$ and a cover $f$, arranged over the inflatable tube and having ribs or enlargements $g$ at its edges. The tire surrounds the rim-body B, and one of the ribs or enlargements $g$ of its cover is disposed and held in the flange $a$ of the rim-body after the manner illustrated at the left of Fig. 1.

D is the tire-clenching band of my improvement, which band is preferably of rolled steel and is split, as indicated by $h$. The base $i'$ of the band D is shaped to surround and rest in the channel portion $b$ of the rim-body B, while the outer portion of the band is turned inwardly to form a retaining-flange $i$, opposed to and adapted to coöperate with the flange $a$ of the rim-body in securely holding the tire C against casual removal or displacement. On the inner side of its base and immediately adjacent to its ends the band D is provided with lugs $k$, which are riveted, brazed, or otherwise fixed with respect thereto. These lugs $k$ are provided with flanges or projections $l$, and when the band D is properly placed on the rim-body B the said lugs $k$ rest opposite the openings $c$ in the channel portion $b$ of the rim-body for a purpose which will be presently made clear.

E is the fastener—*i. e.*, the device which has for its office to tighten the band D upon the channel portion $b$ of the rim-body and secure the said band in its contracted state. The said fastener comprises a body portion $m$, designed to rest parallel to the felly of the wheel and serve as a convenient finger-piece; an end portion $n$ disposed at right angles to the body portion $m$ and extending laterally inward from said body portion, Fig. 1, and having the slightly-rounded end $p$; an arm $r$, extending laterally inward from the portion $m$ and having its edge nearest the portion $n$ rounded or beveled, as indicated by $s$, and a closure portion t, disposed in the same plane as and extending outwardly from the body portion m. The portion t is termed a "closure" portion because it serves when the fastener is swung to the position shown in Fig. 2 to occupy and close the opening c in the channel portion b of the body-rim B, and in order to enable the said portion t to more snugly fill the opening mentioned that edge of the portion t which is presented to the rounded wall d of the opening is concave, as indicated by u and shown by dotted lines in Figs. 1 and 4. The fastener E is pivoted at v to the inner side of the channel portion b of the rim-body B, and hence it will be apparent that when the fastener is swung laterally inward from the position shown in Fig. 1 and until it rests in the same vertical plane as the said portion b the edges p and s of its portions n and r, respectively, will engage the lugs k on the band D, and thereby draw the ends of the band together and tighten the band on one enlargement or rib g of the tire-cover f.

In the practical use of my improvements the tire C is placed around the rim-body B, and one of the ribs or enlargements g of the tire-cover is placed in the retaining-flange a of the rim-body while the fastener E is in its open position and the clenching-band D is in its expanded state. The other rib or enlargement g of the tire-cover f is then placed in the flange i of the band D, as shown in Fig. 1, after which the fastener E is swung or pushed to its closed position. (Shown in Fig. 2.) When the fastener E is manipulated as stated, its portions n and r, coöperating with the lugs k, will obviously draw the ends of the band D together and in that way tighten the band upon one tire portion g and effect a strong and durable connection of the tire as a whole to the rim. It will also be apparent that when the fastener E is in its closed position (shown in Fig. 2) there is no liability of the fastener casually returning to its open position, and consequently no liability of the tire being accidentally released or disconnected from the rim. When, however, it is desirable for any purpose to take the tire C off the rim, the same may be quickly accomplished with but little effort after the fastener E is swung to the open position. (Shown in Fig. 1.)

In addition to the practical advantages which I have hereinbefore ascribed to my improvement it will be noticed that all of the parts of the rim are simple and inexpensive in construction and do not tend in any way to render a wheel cumbersome or unsightly in appearance.

I claim—

1. In a wheel-rim, the combination of a body, a tire-clenching band having lugs adjacent to its ends, and a fastener carried by the body and coöperating with the said lugs of the band to draw the ends of the band toward each other and hold the said ends against movement away from each other.

2. In a wheel-rim, the combination with a body having a retaining-flange at one side and a portion, of channel form in cross-section, at its opposite side and also having an opening in said channel portion; of a tire-clenching band surrounding and seated in the channel portion of the body and having lugs adjacent to its ends and disposed in the said opening in the channel portion of the body, and a fastener carried by the body and arranged to engage the said lugs.

3. In a wheel-rim, the combination with a body; of a tire-clenching band having lugs adjacent to its ends, and a fastener pivoted to the body and having portions arranged to engage the lugs of the band and thereby draw the ends of said band toward each other.

4. In a wheel-rim, the combination with a body having a retaining-flange at one side and a portion, of channel form in cross-section, at its opposite side, and also having an opening in said channel portion; of a tire-clenching band surrounding and seated in the channel portion of the body and having lugs adjacent to its ends disposed in the said opening in the channel portion of the body, and a fastener pivoted to the body and having portions arranged to engage the lugs of the band and thereby draw the ends of the band toward each other and retain the band in its contracted state.

5. In a wheel-rim, the combination of a body having an opening, a tire-clenching band having lugs adjacent to its ends disposed in the opening in the body, and a fastener pivoted to the body and having portions for engaging the lugs of the band.

6. In a wheel-rim, the combination with a body having a portion, of channel form in cross-section, at one side, and also having an opening in said channel portion; of a tire-clenching band surrounding and seated in the channel portion of the body and having lugs adjacent to its ends and disposed in the said opening in the channel portion of the body, and a fastener pivoted to the body and having portions for engaging the said lugs and also having a portion for closing the opening at the side of the channel portion of the body.

7. In a wheel-rim, the combination with a body having a portion, of channel form in cross-section, at one side and also having an opening in said channel portion one of the walls of which is rounded; of a tire-clenching band surrounding and seated in the channel portion of the body and having lugs adjacent to its ends and disposed in the said opening in the channel portion of the body, and a fastener pivoted to the body and having portions for engaging the said lugs and also having a portion for closing the opening at the side of the channel portion of the body, one end of which portion is concave to snugly fit the rounded wall of the opening in the body.

8. In a wheel, the combination of a felly, a tire having ribs or enlargements at opposite sides, and a rim interposed between the felly and the tire and comprising a body having a retaining-flange at one side receiving one rib or enlargement of the tire and also having at its opposite side a portion of channel form in cross-section in which is an opening, a tire-clenching band surrounding and seated in the channel portion of the body and having lugs adjacent to its ends disposed in the opening in said channel portion, and a fastener pivoted to the body and having portions for coöperating with the lugs on the band and also having a portion for closing the opening at the side of the channel portion of the body.

In testimony whereof I have hereunto set my hand in presence of two subscribing witnesses.

GEORGE SHUGERS.

Witnesses:
M. ECKHART,
FRED N. COATS.